United States Patent Office 3,157,463
Patented Nov. 17, 1964

3,157,463
EXTRACTION OF PLUTONIUM AND URANIUM VALUES FROM AQUEOUS SOLUTION
Leland L. Burger, Richland, Wash., assignor to the United States of America as represented by the United States Atomic Energy Commission
No Drawing. Filed May 19, 1961, Ser. No. 111,408
2 Claims. (Cl. 23—14.5)

This invention deals with an improved solvent extraction process and in particular with a process of extracting so-called dissolver solutions for the separation and recovery of plutonium from fission products and uranium. Dissolver solutions are solutions obtained by dissolving neutron-bombarded uranium in nitric acid.

In extraction processes with organic, substantially water-immiscible solvents, emulsions frequently form which slow down coalescence of the phases and thereby impair phase separation; this is especially true when low-acidity feed solutions are used. In some cases emulsion formation is due to the presence of colloidal silica, in other cases to the decomposition and/or polymerization of the solvent, and in still other cases to the inadvertent introduction of surface-active impurities into the system. The emulsions frequently bring about flooding of the extraction columns or other extraction equipment which in turn necessitates interruption of the operation. A minimum effect is that the equipment must be operated at reduced capacity if an emulsion tendency is present. Another very undesirable effect is that separation of one constituent from another, for example separation of plutonium or uranium from fission products, may be very greatly impaired if emulsion formation takes place, because the phases are not completely separated.

It is an object of this invention to provide a method for the processing of aqueous solutions containing plutonium, uranium and fission product values with an organic solvent in which formation of emulsions is prevented.

It is another object of this invention to provide a process for treating aqueous-organic extraction systems by which an emulsion formed is removed.

It is another object of this invention to provide a process for the extraction of aqueous dissolver solutions with a substantially water-insoluble organic solvent for which crude feed solutions can be used as are, that is without any previous clarification treatment.

It is still another object of this invention to provide a process for the extraction of dissolver solutions in which a clear organic phase is obtained.

It is also an object of this invention to provide a process for the extraction of aqueous dissolver solutions with a substantially water-immiscible organic solvent wherein the two phases obtained after extraction coalesce and separate rapidly so that an increased flow rate can be used and a greater capacity is attained within a given period of time for a given apparatus.

It is finally also an object of this invention to provide a process for the extraction of dissolver solutions with substantially water-immiscible organic solvents in which a product solution of considerable purity is obtained.

A great many de-emulsifying agents have been investigated as additives to extraction systems in order to eliminate the above-described drawbacks caused by emulsion formation; however, none of the substances investigated was found operative. It was then all the more surprising when it was discovered that finely divided talc, which is a hydrous magnesium silicate, or powdered bentonite causes coalescence and separation of organic and aqueous phases when added to the extraction system and that the phases could then be separated without difficulty. The talc was found to transfer suspended organic matter, such as grease, as well as siliceous matter from the aqueous into the organic phase and to form a scum with the emulsified impurities. This scum settled in the interface whence it could be removed by customary means, such as centrifugation, filtration and flotation or by simply discharging portions of the column content including the interface region. Also, if talc was added to the aqueous feed solution or to the organic extractant prior to contact, the formation of an emulsion was prevented. The effect of talc is so strong that, when added to an organic liquid system containing an emulsifying agent, emulsions cannot form. The extraction efficiency is not impaired by the addition of talc. The process of this invention is based on these findings.

The process of this invention thus comprises contacting the aqueous solution and the water-insoluble organic liquid in the presence of talc or bentonite.

The quantity of the adsorbent, talc or bentonite, depends to a certain degree on the salt concentrations of the aqueous feed solutions; for instance, for a feed solution containing less than 0.1% salts, 50 parts by weight of talc or bentonite per million parts by weight of solution were found sufficient. For solutions containing more than 0.1% solids, at least 100 p.p.m. of the additive should be added. Concentrations of up to 500 p.p.m. of adsorbent have been used successfully. The preferred quantity, however, is 100 p.p.m.

The particle size of the talc or bentonite powder may vary widely; however, a grain size of about 25 microns was found best suitable. One way of incorporating the adsorbent is to add it to the aqueous feed solution prior to contact with the organic extractant, but other methods are also satisfactory, since agitation of the mixture of aqueous and organic solutions provides for thorough contact and dispersion of the talc. All of the extraction procedures can be carried out at room temperature, but other temperatures are equally satisfactory. The scum settled at the interface is removed periodically by centrifugation, filtration, flotation or interface ejection.

The process of this invention is applicable to any type of aqueous-organic solvent extraction, for instance to that with hexone or tributyl phosphate; it brings about a particularly great improvement in the extraction of feed solutions that have a low acid concentration, because there formation of emulsions is often worst.

In the following, a few examples are given to illustrate the process of this invention.

EXAMPLE I

A number of runs were carried out with aliquots of a feed solution containing uranium, plutonium and fission products and also nitric acid in a concentration of 3 M. The extractant in all instances was a 30 vol. percent tributyl phosphate solution in a hydrocarbon diluent. The results are summarized in Table I. In some of the runs surface-active agents other than those of the invention were added for the sake of comparison. The surfactant sorbitan monolaurate is an organophilic agent, while polyoxyethylene sorbitan monolaurate is a hydrophilic agent. The systems designated as "Pure" did not contain either emulsifying agent before incorporation of the additives.

Table I

| Run No. | Additives | Coalescence Time (Seconds) | |
|---|---|---|---|
| | | Organic Phase Continuous | Aqueous Phase Continuous |
| 1 | No additive | 37 | 15 |
| 2 | Polyoxyethylene sorbitan monolaurate | 210 | 100 |
| 3 | Trace of talc | 20 | (1) |
| 4 | 0.1% sorbitan monolaurate | 40 | 60 |
| 5 | Sorbitan monolaurate and talc | 20 | 6 |
| 6 | 0.001% collodial silica | | 120 |
| 7 | Ca. 0.01% talc added to the system of Run no. (6) | | 12 |
| 8 | 0.01% collodial silica added to (7) | | 12 |
| 9 | 0.01% collodial silica in pure system | | (2) |

[1] Dispersion difficult to maintain.
[2] Stable emulsion.

It will be readily recognized from these data that runs 7 and 8, which contained about 0.01% of talc, showed a considerably shorter coalescence time than did the solutions of runs 6 and 9. Likewise, run 5 shows improved coalescence over run 4 because of the addition of talc.

EXAMPLE II

Another set of experiments was carried out using hexone as the extractant. The aqueous feed solution contained 0.51 gram of plutonium per liter and it was 1.00 M in aluminum nitrate nonahydrate and 1.25 M in uranyl nitrate hexahydrate. Equal volumes (25 ml.) of extractant and feed solution were contacted in each run while mixed by a mechanical stirrer. The acidity of the feed solutions used for each run as well as the quantities of talc added are shown in Table II. The results are expressed as the times necessary for phase disengagement.

Table II

| HNO$^3$ in Feed, M | Talc, p.p.m. | Disengaging Time, seconds |
|---|---|---|
| 0.1 | | 40 |
| 0.1 | 128 | 8 |
| 1.0 | | 50 |
| 1.0 | 128 | 8 |
| 0.1 | | 42 |
| 0.3 | | 45 |
| 0.3 | 128 | 10 |
| 1.0 | 128 | 20 |
| 0.3 | | >600 |
| 0.3 | 50 | 105 |
| 0.3 | 175 | 53 |

Also here, the radical improvement brought about by the addition of talc is obvious.

EXAMPLE III

Four runs were carried out in the same manner as those of Example II with a feed solution obtained by dissolving plutonium-containing slag and crucibles in nitric acid. In two runs the feed solution contained salts in a concentration of above 0.2%, and in the other two runs the solution contained salts in a concentration of below 0.2%. Hexone was again used as the extractant, and the volume ratio of aqueous:organic was 2. In two of the four runs, one of the higher and of the lower salt concentration, no talc was added, while in the other two instances about 350 p.p.m. of talc were added. The results are compiled in Table III.

Table III

| Feed | Disengaging Time | |
|---|---|---|
| | No Talc | 350 p.p.m. of Talc Added |
| Over 0.2% solids | 8 min | 30 sec. |
| Under 0.2% solids | 55 sec | 15 sec. |

It will be seen that, in the first group of parallel tests where the solids content was above 0.2%, the disengaging time was reduced from 8 minutes to 30 seconds and that in the instance of higher solids concentration the phase separation time was reduced from 55 seconds to 15 seconds.

EXAMPLE IV

The results of this example were obtained in actual plant operation. The feed was an aqueous nitric acid solution containing plutonium nitrate, nitrates of other metals, and various impurities. The solvent was a solution consisting of 20% by volume of tributyl phosphate and 80% by volume of carbon tetrachloride. The volume ratio of feed to solvent was about 2:1. The extraction was carried out in a pulsed extraction column. Severe emulsification problems were encountered which materially impaired the efficiency of the operation. Addition of talc largely corrected this condition. The following tabulation shows results obtained on successive months (month A and month B) during which other operating conditions remained essentially the same. (The concentration of impurities in the feed solution was higher in month B than in month A.)

| Month | Feed Additives | Average Feed, Liters per day | Percent Time Lost Due to Flooding |
|---|---|---|---|
| A | None | 1,260 | 15 |
| B | 50–100 p.p.m. talc | 1,870 | 3 |

It will be understood that this invention is not to be limited to the details given herein but that it may be modified within the scope of the appended claims.

What is claimed is:

1. A process of separating plutonium and uranium values from fission product values present together in an aqueous nitric acid "dissolver" solution, consisting in contacting said liquid aqueous solution with a liquid extractant, at least one of said liquids containing colloidal matter and said extractant consisting of and being selected from the group consisting of hexone and an organic solution of tributyl phosphate, said contact being carried out while said liquids are in contact with about 50 to about 350 parts by weight of a finely divided material per million parts by weight of said aqueous solution, said material consisting of and being selected from the group consisting of bentonite and talc, whereby said colloidal matter is taken up by said material by a purely physical action and a scum is formed, whereby a distinct aqueous phase containing said fission product values and a distinct extract phase containing said uranium and plutonium values are formed and said scum settles in the interface between said aqueous and extract phases, whereby the formation of new colloidal matter is prevented and whereby said values are retained in said phases and separating said scum, said aqueous phase and said extract phase.

2. The process of claim 1 wherein the material is present in a quantity of about 100 p.pm. of aqueous solution.

References Cited by the Examiner

UNITED STATES PATENTS

| | | | |
|---|---|---|---|
| 705,253 | 7/02 | Krause | 252—324 |
| 1,911,797 | 5/33 | Brown | 252—324 |
| 2,345,827 | 4/44 | Olin | 252—324 XR |
| 2,761,563 | 9/56 | Waterman et al. | 210—21 |
| 2,796,320 | 6/57 | Spedding et al. | 23—312 XR |
| 3,092,446 | 6/63 | Morgan | 23—312 |

NORMAN YUDKOFF, *Primary Examiner.*

JAMES H. TAYMAN, JR., *Examiner.*